United States Patent
Chou et al.

(10) Patent No.: US 7,375,884 B2
(45) Date of Patent: May 20, 2008

(54) REAR PROJECTION SCREEN AND OPTICAL DEVICE THEREOF

(75) Inventors: Yen-Chun Chou, Hsinchu (TW); Ta-Kun Kung, Taipei County (TW)

(73) Assignee: Prodisc Technology Inc., Taipei Hsien (TW)

( * ) Notice: Subject to any disclaimer, the term of this patent is extended or adjusted under 35 U.S.C. 154(b) by 118 days.

(21) Appl. No.: 11/024,407

(22) Filed: Dec. 30, 2004

(65) Prior Publication Data
US 2006/0082878 A1    Apr. 20, 2006

(30) Foreign Application Priority Data
Oct. 20, 2004    (TW) .............................. 93131876 A (51) Int. Cl.
*G03B 21/60*    (2006.01)
*G03B 21/56*    (2006.01)
(52) U.S. Cl. ...................... 359/460; 359/453; 359/455; 359/456; 359/457
(58) Field of Classification Search ................ 359/443, 359/452–457, 460
See application file for complete search history.

(56) References Cited

U.S. PATENT DOCUMENTS

| 4,431,266 | A  | * | 2/1984 | Mori et al. ................. 359/456 |
| 6,278,546 | B1 | * | 8/2001 | Dubin et al. ................ 359/452 |
| 6,700,702 | B2 | * | 3/2004 | Sales .......................... 359/443 |
| 6,862,139 | B2 | * | 3/2005 | Chang et al. ............... 359/453 |
| 2003/0169332 | A1 | * | 9/2003 | Ebina et al. .................. 348/52 |

* cited by examiner

*Primary Examiner*—Diane I. Lee
*Assistant Examiner*—Magda Cruz
(74) *Attorney, Agent, or Firm*—Birch, Stewart, Kolasch & Birch, LLP (57) ABSTRACT

A rear-projection screen comprises an optical unit, a light-blocking layer, and an optical lens. The optical unit has a first surface and a second surface. The first surface is opposite to the second surface. The first surface has a plurality of cylindrical convexes and the second surface has a plurality of irregular protruding parts. The light-blocking layer adjoins to the second surface and has a plurality of striped light-absorbing units. The optical lens is disposed adjacent to the optical unit.

20 Claims, 8 Drawing Sheets

PRIOR ART

REAR PROJECTION SCREEN AND OPTICAL DEVICE THEREOF

BACKGROUND OF THE INVENTION

1. Field of Invention

The invention relates to a rear projection screen and an optical device thereof and, in particular, to a rear projection screen and an optical device thereof, which can prevent the moiré effect.

2. Related Art

Rear projection televisions are generally applied to television teaching and training of real-sight simulation for pilots and drivers. However, with raising the living standards and improving the living conditions, the rear projection television becomes more and more favor to consumers. Rear projection television is characterized by its wide screen and clear image. Comparing with the conventional cathode ray tube (CRT) television, the rear projection television has the advantages of low irradiation and large screen dimensions, and can connect directly to the computer or other video apparatuses for achieving the maximum of entertainment effects. Therefore, it can be predicted that the rear projection television will play a major role in the market of the entertainment display in the future. In the rear projection television, the image is projected onto the real projection screen from rear side of the screen, and the viewers can obtain the image from the front side of the screen. As a result, there has been a demand for considering that the viewing angles, image contrast, image resolution, and image brightness and so on while one designs the rear projection television.

Figure 1:
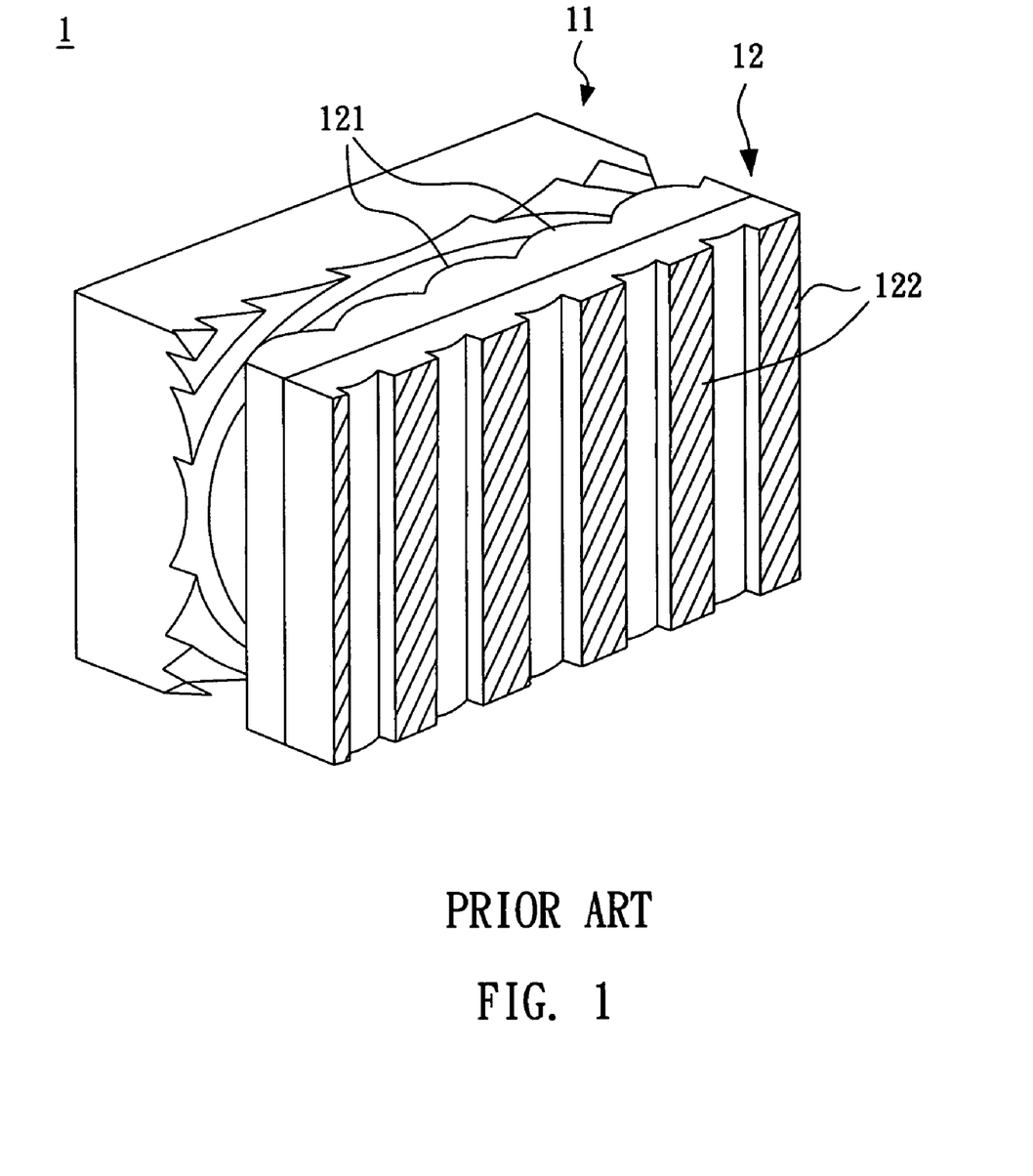
FIG. 1 is a solid view showing the conventional rear projection screen.

With reference to FIG. 1, a conventional rear projection screen 1, which is composed of a Fresnel lens 11 and a lenticular lens 12, is a transmissive screen. The Fresnel lens 11 can facilitate to properly utilize light within the visual area so as to raise the brightness and uniformity of image. The lenticular lens 12 is used to generate the image.

The lenticular lens 12 has a plurality of cylindrical convexes 121 formed on the light-incident surface and a plurality of black stripes 122 formed on the light-emitting surface. The incident light beams from the light source are focused in the Fresnel lens 11 and passed away as the parallel light beams, which are incident into the cylindrical convexes 121 later and are further focused. The black stripes 122 made of the light-blocking material are accurately formed in positions corresponding to non-focusing parts of the cylindrical convexes 121. The black stripes 122 formed on the light-emitting surface are used to absorb the light beams for reducing the interference of the outside light.

Generally, a plurality of the black stripes 122 disposed on the cylindrical lens 12 is manufactured as the following description. Coating a photoresist on a surface of the cylindrical lens 12, on which the black stripes 122 are to be formed. Next, the cylindrical convexes 121 is irradiated with light beams from a light source, so that the light beams can be focused with the cylindrical lens 12 on the photoresist. Then, the black stripes 122 is formed by positive development (or negative development) procedures. As the cylindrical convexes 121 are arranged regularly and have approximately the same curvatures and heights, the manufactured black stripes 122 are regular arranged and have the same widths. This may easily cause the interference effect, resulting in the so-called moiré phenomenon that reduces the quality of the image.

Therefore, it is a subjective of the invention to provide a rear projection screen and an optical device thereof, which relieve the moiré phenomenon of the conventional rear projection screen.

SUMMARY OF THE INVENTION

In view of foregoing, the invention is to provide a rear projection screen and an optical device thereof, which can reduce the moiré effect.

To achieve the above, an optical device of the invention comprises an optical unit and a light-blocking layer. The optical unit has a first surface and a second surface. The first surface is opposite to the second surface. The first surface has a plurality of cylindrical convexes and the second surface has a plurality of irregular protruding parts. The light-blocking layer adjoins to the second surface and has a plurality of striped light-absorbing units.

Additionally, to achieve the above, a rear-projection screen of the invention comprises an optical unit, a light-blocking layer, and an optical lens. The optical unit has a first surface and a second surface. The first surface is opposite to the second surface. The first surface has a plurality of cylindrical convexes and the second surface has a plurality of irregular protruding parts. The light-blocking layer adjoins to the second surface and has a plurality of striped light-absorbing units. The optical lens is disposed adjacent to the optical unit.

As mentioned above, a rear projection screen and an optical device thereof of the invention have a plurality of irregular protruding parts for changing the travel routes of light beams. As a result, different widths of the striped light-absorbing units are formed so that the moiré effect is improved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
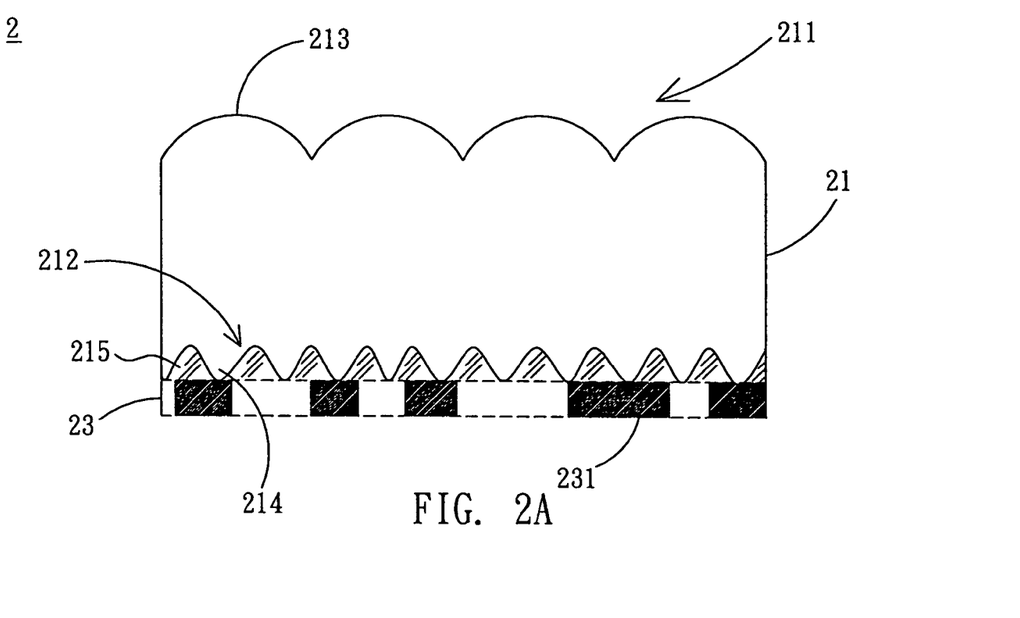
FIGS. 2A to 2F are schematic views showing an optical device according to a preferred embodiment of the invention.

With reference to FIG. 2A, the optical device 2 according to the embodiment of the invention comprises an optical unit 21 and a light-blocking layer 23. The optical unit 21 has a first surface 211 and a second surface 212. The first surface 211 is opposite to the second surface 212. The first surface 211 has a plurality of cylindrical convexes 213 and the second surface 212 has a plurality of irregular protruding parts 214. The light-blocking layer 23 adjoins to the second surface 212 and has a plurality of striped light-absorbing units 231. In case when a light beam irradiates the optical device 2, the cylindrical convexes 213 are used to focus the light beam while the irregular protruding parts 214 are used to change the travel route of the light beam. Therefore, the light beam passing trough the second surface 212 is distributed irregularly for forming the different widths of the striped light-absorbing units 231. In this embodiment, the optical device 2 is a lenticular lens, which is used to focus a parallel light beam incident into the cylindrical convexes 213. The striped light-absorbing units 231 are used to absorb light beams for reducing the interference of outside light beams. However, in this embodiment, the protruding parts 214 are not limited to the shape of an arc as shown in FIG. 2A, they also can be the shape of a triangle, a trapezoid, an ellipse or other forms known by one of ordinary skill in the art.

The light-blocking layer 23 adjoining to the second surface 212 has a plurality of striped light-absorbing units 231 with different widths from one another. In this embodiment, the striped light-absorbing units 231 are made of a dark printing ink for absorbing the light beams. In practice, a concave 215 formed between two protruding parts 214 is filled with a transparent material for making the second surface 212 to be flat. After that, the light-blocking layer 23 is disposed on the second surface 212. With reference to FIG. 2E, in actual manufacturing procedures, when the dimension of the concave 215 is very fine, the transparent material is unnecessary to fill the concave 215 and the light-blocking layer 23 can be form directly on the second surface 212. Thus, the striped light-absorbing units 231 are formed corresponding to the shapes of the irregular protruding parts 214.

In this embodiment, a plurality of striped light-absorbing units 231 disposed on the second surface 212 is formed as follows. The second surface 212 is coated with a photoresist. A plurality of the cylindrical convexes 213 on the first surface 211 is irradiated with a light beam from a light source. Next, the light beam is focused regularly and passes through the protruding parts 214, which changes the travel rout of the light beam, so that the light beam can be focused irregularly on the photoresist. Finally, a plurality of the striped light-absorbing units 231 on the second surface 212 is formed by positive development or negative development procedures.

Figure 2B:
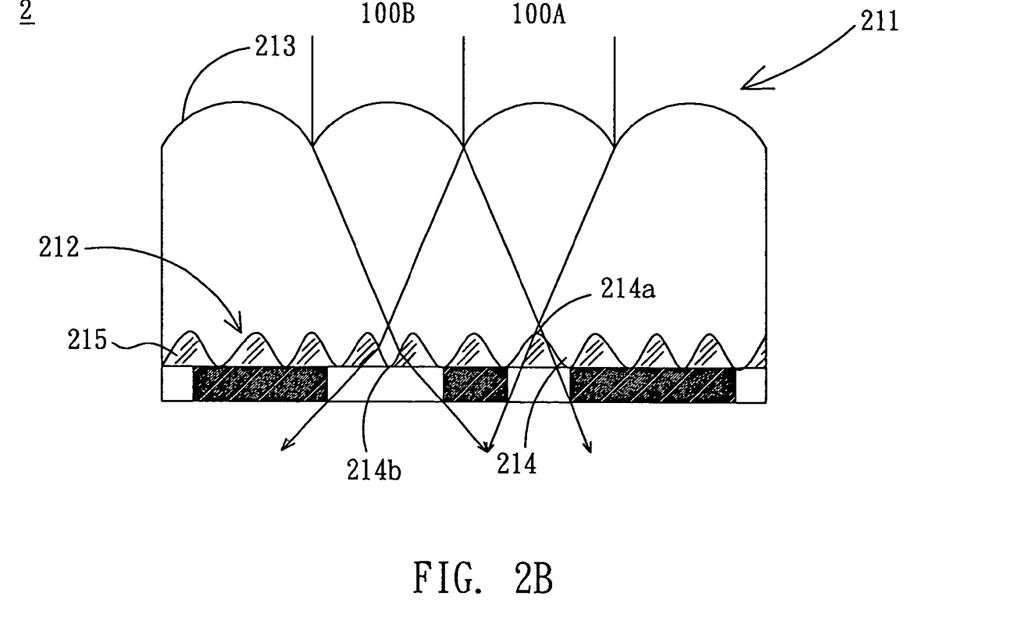

To make the invention more comprehensive, an example is taken with reference to FIG. 2B. Herein, the travel routes of the light beams can be changed with the irregular protruding parts 214 so as to obtain the difference widths of the striped light-absorbing units 231. In more detailed, two light beams 100A and 100B are incident into each of the cylindrical convexes 213 in parallel. The cylindrical convexes 213 are used to focus the light beams 100A and 100B. Due to the second surface 212 has a plurality of irregular protruding parts 214, the light beams 100A and 100B will arise condensation or dispersion phenomenon. The light beam condenses slightly at the peak portions 214a of the protruding parts 214 and the light beam disperses slightly at the foot portions 214b of the protruding parts 214. As a result, the light beams 100A and 100B diverge with different width from each other. In addition, after coating a photoresist on the second surface 212, the positive development or negative development procedures including the irradiation of the aforementioned light beams 100A and 100B are progressed. The regularity of the light beams can be changed by the protruding parts 214 and the light beams then irradiate the light-blocking layer 23. Accordingly, the light-blocking layer 23 can be processed to form the striped light-absorbing units 231 with different widths.

Figure 2C:
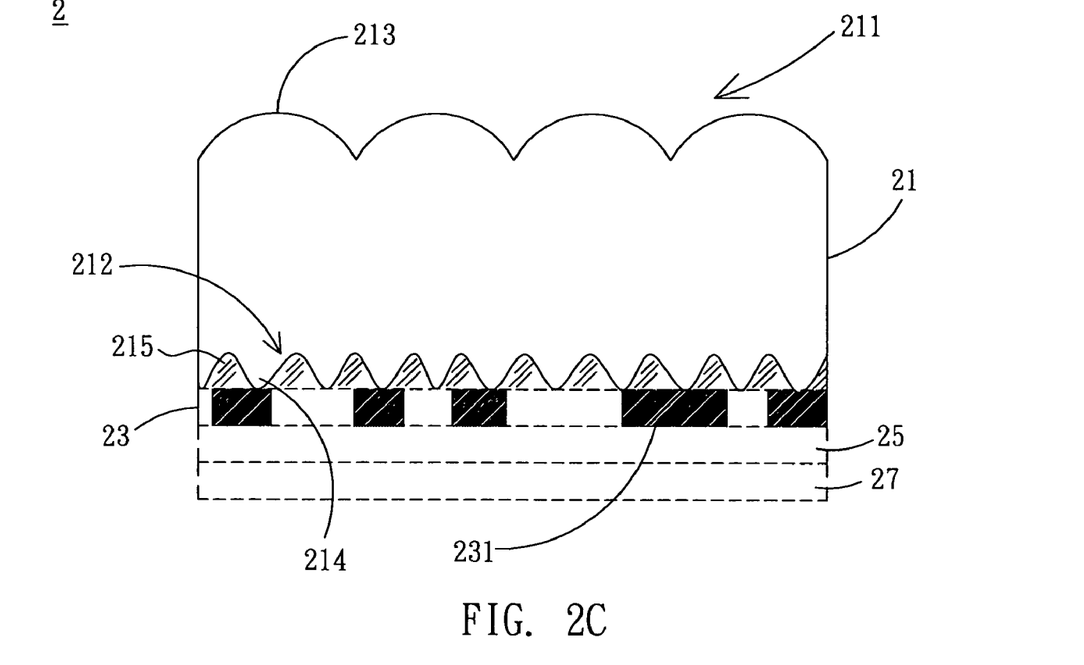
Figure 2D:
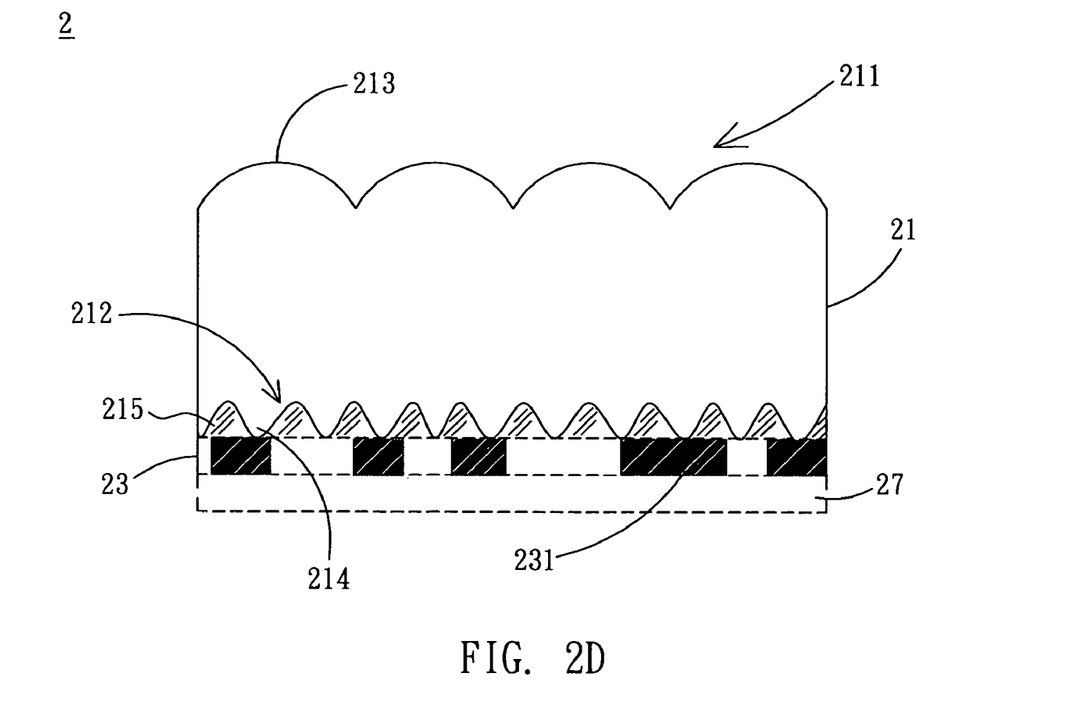
Figure 2E:
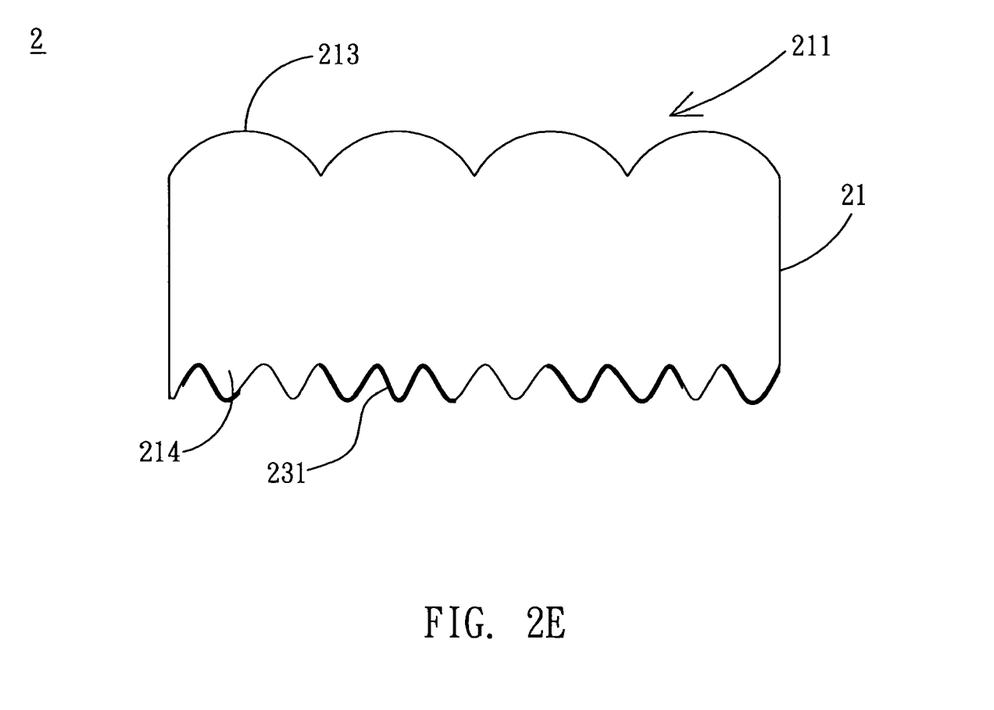

Additionally, with reference to FIG. 2C and FIG. 2D, the optical device 2 according to the embodiment of the invention further comprises a light-diffusing layer 25 and/or an anti-reflection layer 27 for increasing viewing angles. The light-diffusing layer 25 is disposed on the light-blocking layer 23 as shown in FIG. 2C; otherwise, the anti-reflection layer 27 is disposed on the light-blocking layer 23 as shown in FIG. 2D. Alternatively, the anti-reflection layer 27 can be disposed on the light-diffusing layer 25 (as is shown in FIG. 2C).

Figure 2F:
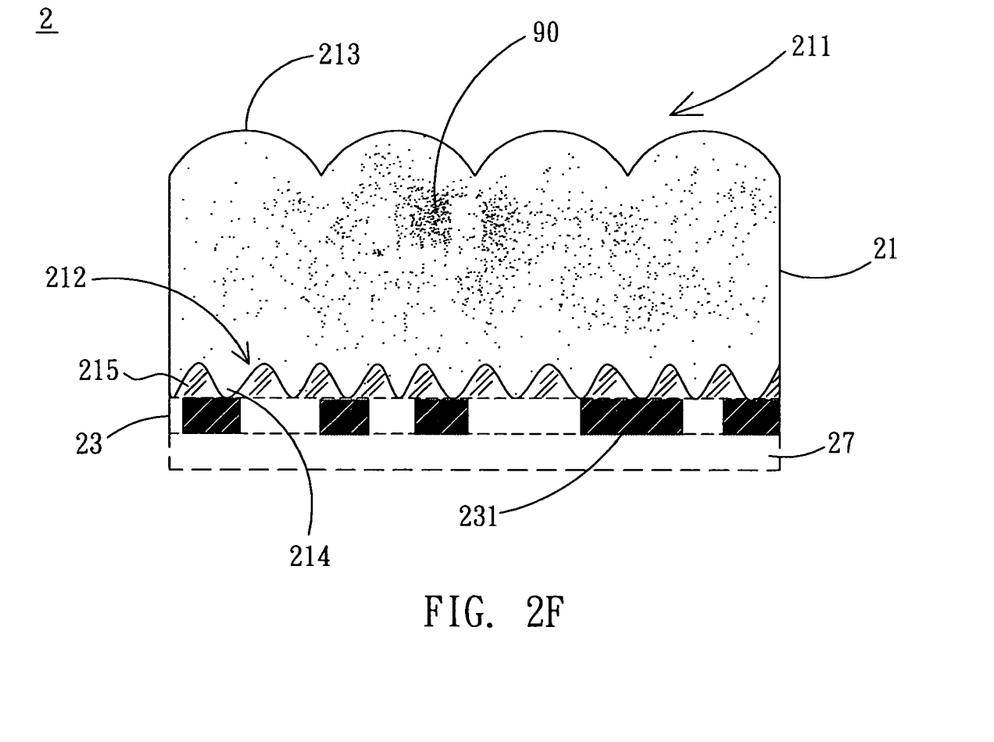

With reference to FIG. 2F, in order to increase viewing angles, the optical unit 21 can further be filled with a plurality of light-diffusing particles 90. In the present embodiment, it is also applied for one of ordinary skill in the art to dispose the anti-reflection layer 27 on the light-blocking layer 23.

As the aforementioned, the irregular protruding parts 214 change the travel routes of light beams to break the regularity of the light beams, so that the striped light-absorbing units 231 are formed with different widths so as to reduce the moiré phenomenon. Additionally, the optical device 2 can be integrally formed.

Figure 3A:
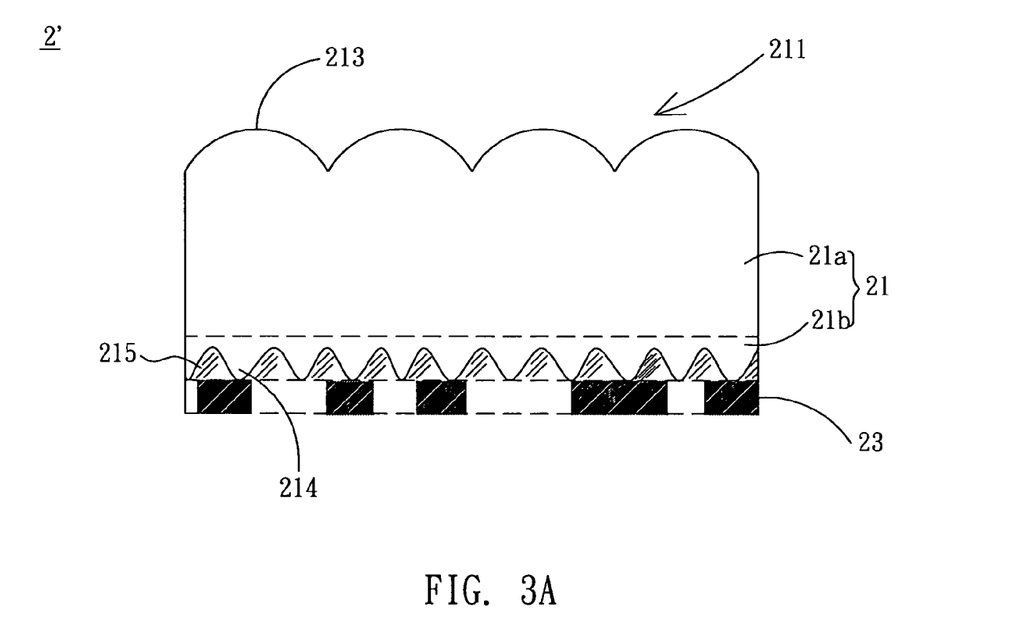
FIGS. 3A to 3D are schematic views showing an optical device according to another preferred embodiment of the invention.

With reference to FIG. 3A, the optical device 2' according to another embodiment of the invention comprises an optical unit 21 and a light-blocking layer 23. The optical unit 21 has a first optical lens 21a and a second optical lens 21b. The first optical lens 21a can be a lenticular lens. One side of the first optical lens 21a has a plurality of cylindrical convexes 213 for focusing the light beams while another side of the first optical lens 21a is a flat surface. One side of the second optical lens 21b is a flat surface while another side of the second optical lens 21b has a plurality of irregular protruding parts 214. The flat surfaces of the first optical lens 21a and the second optical lens 21b are connected by using a glue to form an optical unit 21.

Figure 3B:
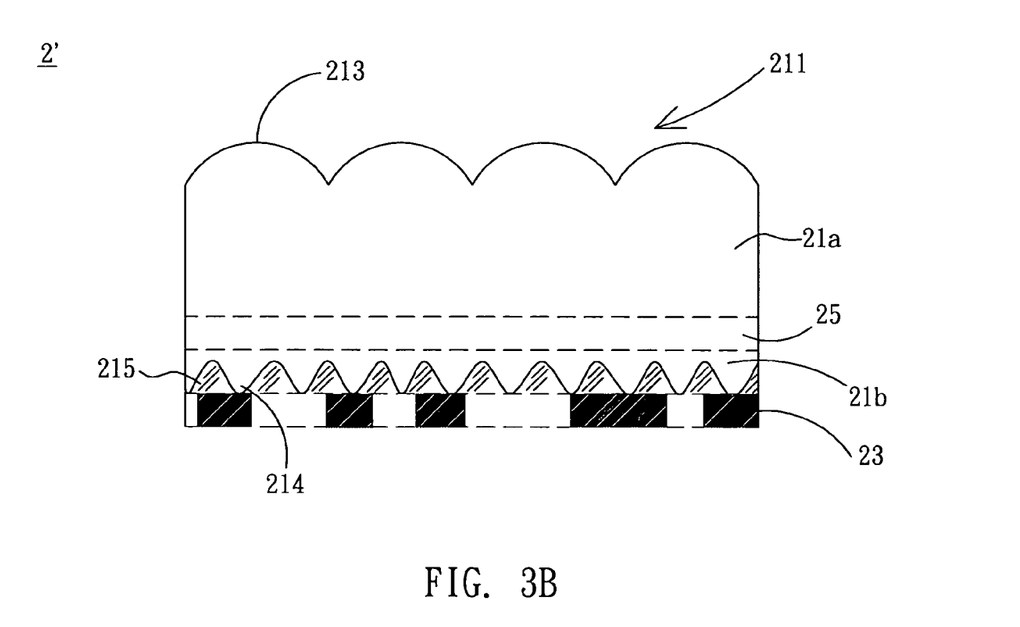
Figure 3C:
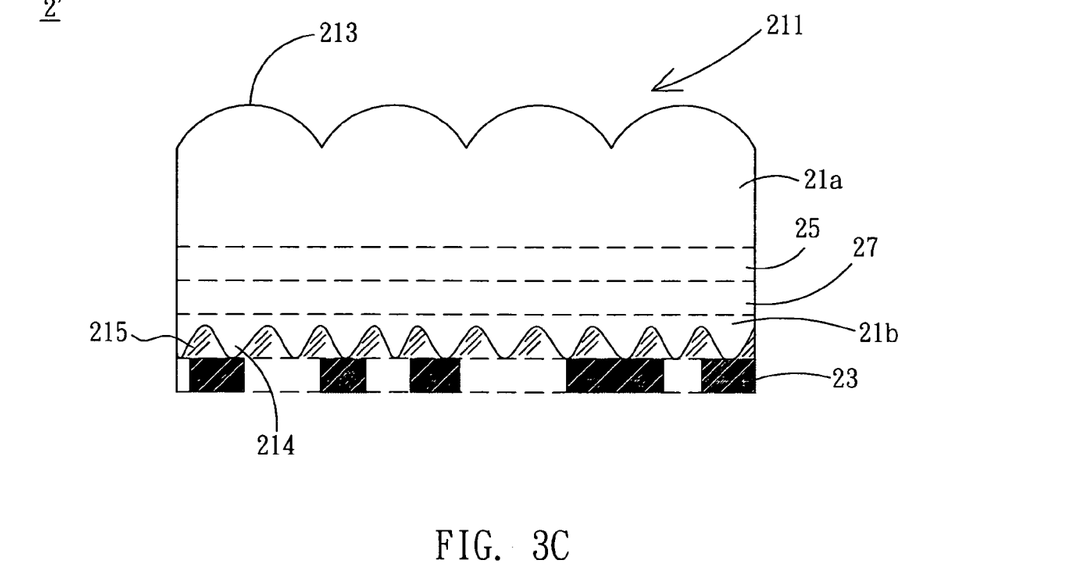

Additionally, with reference to FIG. 3B, the optical device 2' further comprises a light-diffusing layer 25, which can be disposed between the first optical lens 21a and the second optical lens 21b or on the light-blocking layer 23. With reference to FIG. 3C, the optical device 2' further comprises an anti-reflection layer 27, which also can be disposed between the first optical lens 21a and the second optical lens 21b or on the light-blocking layer 23.

Figure 3D:
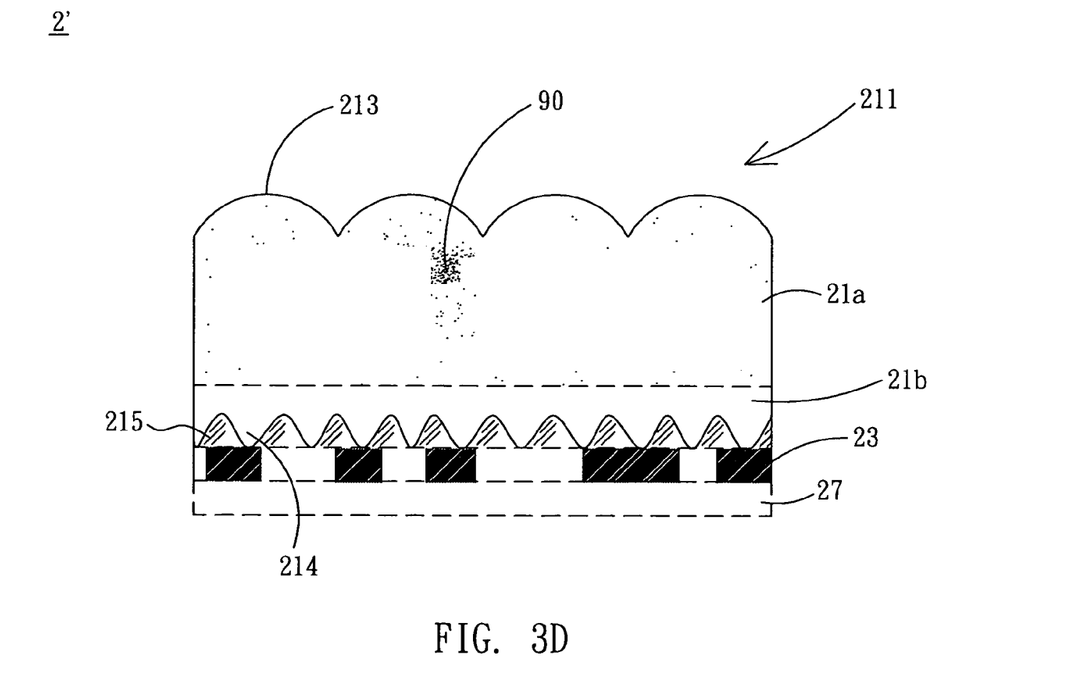

With reference to FIG. 3D, the optical device 2' is further filled with a plurality of light-diffusing particles 90 into the optical unit 21 for increasing viewing angles. In this embodiment, the skilled people also can dispose the anti-reflection layer 27 on the light-blocking layer 23 or between the first optical lens 21a and the second optical lens 21b.

Figure 4:
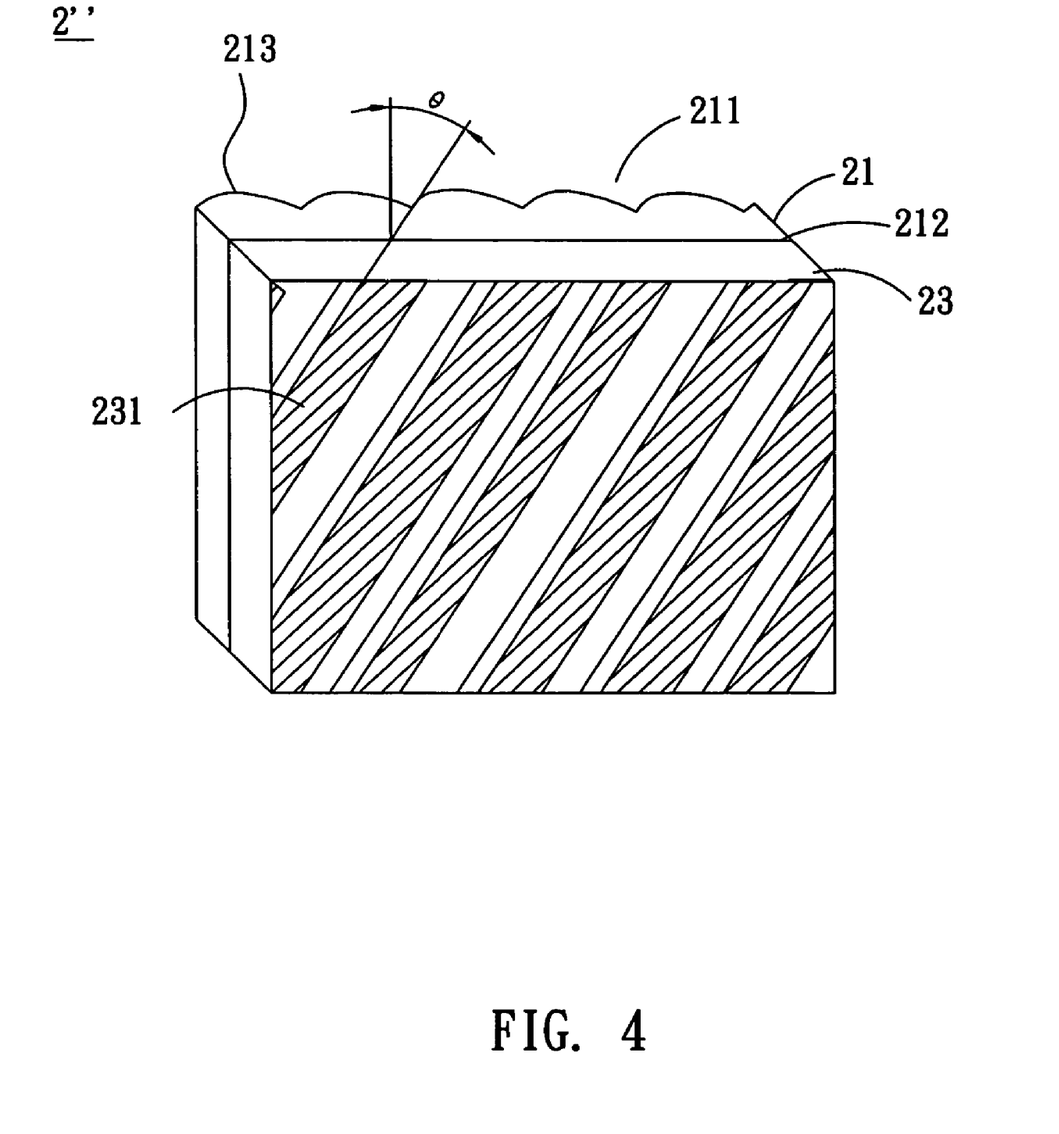
FIG. 4 is a schematic view showing an optical device according to still another preferred embodiment of the invention.

With reference to FIG. 4, the optical device 2" according to still another embodiment of the invention comprises an optical unit 21 and a light-blocking layer 23. The optical unit 21 having a first surface 211 and a second surface 212 can be integrally formed or be formed by connecting the first optical lens 21a and the second optical lens 21b. The structures of the first optical lens 21a and second optical lens 21b are as shown in FIG. 3A, so the detailed descriptions are omitted herein. The first surface 211 and the second surface 212 of the optical unit 21 are opposite with each other. The first surface 211 has a plurality of cylindrical convexes 213 and the second surface 212 has a plurality of irregular protruding parts. The light-blocking layer 23 adjoining to the second surface 212 is a transparent thin film, which is formed by filling the irregular protruding parts 214 of the second surface 212 to be flat. The light-blocking layer 23 has a plurality of striped light-absorbing units 231 with different widths from each other. The striped light-absorbing units 231 are made of dark printing ink. Wherein, an extension from the striped light-absorbing unit 231 and an extension from the cylindrical convex 213 have an included angle ranged between 0 to 90 degrees for increasing perpendicular viewing angles. Moreover, although the light-blocking layer 23 is used to fill the second surface 212 to be flat in this embodiment, the light-blocking layer 23 also can be disposed in accordance with the shape of the second surface 212. Herein is not limited to necessity for filling the second surface 212 to be flat.

Figure 5:
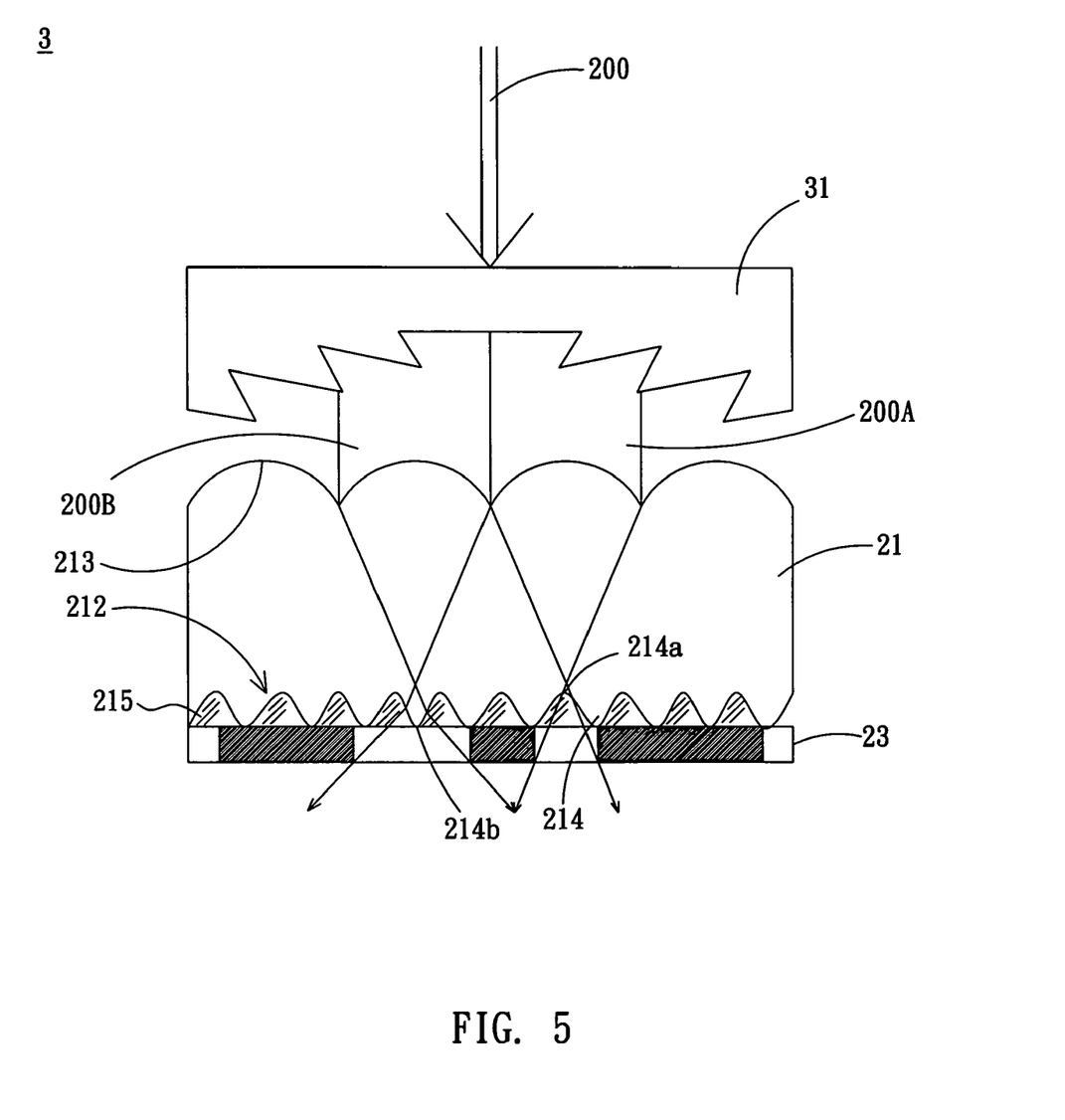
FIG. 5 is a schematic view showing a rear projection screen according to a preferred embodiment of the invention.

With reference to FIG. 5, the rear-projection screen 3 according to the embodiment of the invention is by using aforementioned optical device 2 to generate image. The rear-projection screen 3 comprises an optical lens 31, an optical unit 21 and a light-blocking layer 23. The optical unit 21 and the light-blocking layer 23 are as shown in FIG. 2A, so the detailed descriptions are omitted.

The optical lens 31 is a Fresnel lens. The optical lens 31 is disposed adjacent or connective to the optical unit 21 for condensing divergent the light beams into viewing angles of viewers. As a result, the light beams can be condensed and passed away from the Fresnel lens in parallel from each other so as to be incident into the optical unit 21.

Following taken an example for explain more specifically, a light beam 200 is directed with the optical lens 31 and is incident in parallel into the optical unit 21. After being incident into each of the cylindrical convexes 213, the light beam 200 is divided into the light beams 200A and 200B. The light beams 200A and 200B are focused by the cylindrical convexes 213 and passed trough the second surface 212. Due to the second surface 212 has a plurality of irregular protruding parts 241, the light beams 200A and 200B arise condensation or dispersion phenomenon. As a result, the light beam 200A condenses slightly on one of the peak portions 214a of the protruding parts 214 and the light beam 200B disperses slightly on one of the foot portions 214b of the protruding parts 214. The regularity of the light beams 200A and 200B can be changed via the protruding parts 214, and the light beams 200A and 200B finally focus on the light-blocking layer 23. Due to the light-blocking layer 23 has a plurality of striped light-absorbing units 231 with different widths, the light beams 200A and 200B transmitted out from the light-blocking layer 23 can be diverged so randomly that can improve the moiré effect of the real-projection screen.

In conclusion, a rear projection screen and an optical device thereof according to the embodiment of the invention consists of a plurality of irregular protruding parts for changing the travel routs of the light beams and forming striped light-absorbing units with different widths. Thus, the moiré phenomenon arising from the regular periodicity of the striped light-absorbing units can be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical device, comprising:
   an optical unit, which has a first surface and a second surface, wherein the first surface is opposite to the second surface, the first surface has a plurality of cylindrical convexes and the second surface has a plurality of irregular protruding parts, the protruding parts being non-uniformly spaced relative to one another; and
   a light-blocking layer, which adjoins to the second surface and has a plurality of striped light-absorbing units, the plurality of irregular protruding parts being between the light-blocking layer and the plurality of cylindrical convexes.

2. The optical device of claim 1, wherein the optical unit comprises:
   a first optical lens; and
   a second optical lens, which adjoins to the first optical lens, wherein the first surface is formed on one side of the first optical lens and the second surface is formed on one side of the second optical lens.

3. The optical device of claim 2, further comprising:
   a light-diffusing layer, which is disposed between the first optical lens and the second optical lens.

4. The optical device of claim 2, further comprising:
   an anti-reflection layer, which is disposed between the first optical lens and the second optical lens.

5. The optical device of claim 2, wherein the first optical lens is a lenticular lens.

6. The optical device of claim 1, further comprising:
   a light-diffusing layer, which is disposed on the light-blocking layer.

7. The optical device of claim 1, further comprising:
   an anti-reflection layer, which is disposed on the light-blocking layer.

8. The optical device of claim 1, wherein the widths of the striped light-absorbing units are different from each other.

9. The optical device of claim 1, wherein the irregular protruding part has a shape of an arc, a triangle, a trapezoid, or an ellipse.

10. The optical device of claim 1, wherein the striped light-absorbing unit is made of dark printing ink.

11. The optical device of claim 1, wherein an extension from the striped light-absorbing unit and an extension from the cylindrical convex have an included angle ranged between 0 to 90 degrees.

12. The optical device of claim 1, further comprising:
    a plurality of light-diffusing particles, which are distributed in the optical unit.

13. A rear-projection screen, comprising:
    an optical unit, which has a first surface and a second surface, wherein the first surface is opposite to the second surface, the first surface has a plurality of cylindrical convexes and the second surface has a plurality of irregular protruding parts, the protruding parts being non-uniformly spaced relative to one another;
    a light-blocking layer, which adjoins to the second surface and has a plurality of striped light-absorbing units having different widths, the plurality of irregular protruding parts being between the light-blocking layer and the plurality of cylindrical convexes; and
    an optical lens, which is disposed adjacent to the optical unit,
    the second surface being coated with a photoresist, whereby when al light beam irradiates in the first surface and passes through the protruding parts, the light beam is irregularly irradiated on the photoresist.

14. The rear-projection screen of claim 13, wherein the optical lens is a Fresnel lens.

15. The rear-projection screen of claim 13, wherein the optical unit comprises:
 a first optical lens; and
 a second optical lens, which adjoins to the first optical lens, wherein the first surface is formed on one side of the first optical lens and the second surface is formed on one side of the second optical lens.

16. The rear-projection screen of claim 15, wherein the first optical lens is a lenticular lens.

17. The rear-projection screen of claim 13, the widths of the striped light-absorbing units are different from each other.

18. The rear-projection screen of claim 13, wherein the irregular protruding part has a shape of an arc, a triangle, a trapezoid, or an ellipse.

19. The rear-projection screen of claim 13, wherein the striped light-absorbing unit is made of dark printing ink.

20. The rear-projection screen of claim 13, wherein an extension from the striped light-absorbing unit and an extension from the cylindrical convex have an included angle ranged between 0 to 90 degrees.

* * * * *